(12) United States Patent
Vaidya et al.

(10) Patent No.: US 12,499,722 B2
(45) Date of Patent: Dec. 16, 2025

(54) SYSTEMS AND METHODS FOR VISUALLY INDICATING A SENSOR STATUS

(71) Applicant: CUMMINS FILTRATION IP, INC., Columbus, IN (US)

(72) Inventors: Abhijeet Vaidya, Columbus, IN (US); Daniel Potratz, Stoughton, WI (US); Erica C. Clark-Heinrich, Cookeville, TN (US); Mahesh Suresh Chindarkar, Sangli (IN); Abhijeet Pande, Pune (IN); Rereloluwa Oluwafemi Fatunmbi, Columbus, IN (US)

(73) Assignee: ATMUS FILTRATION IP INC., Nashville, TN (US)

( * ) Notice: Subject to any disclaimer, the term of this patent is extended or adjusted under 35 U.S.C. 154(b) by 822 days.

(21) Appl. No.: 17/182,916

(22) Filed: Feb. 23, 2021

(65) Prior Publication Data

US 2021/0183185 A1     Jun. 17, 2021

Related U.S. Application Data

(63) Continuation of application No. PCT/US2019/044854, filed on Aug. 2, 2019.
(Continued)

(51) Int. Cl.
*G07C 5/08* (2006.01)
*B60Q 9/00* (2006.01)
(Continued)

(52) U.S. Cl.
CPC ............. *G07C 5/0825* (2013.01); *B60Q 9/00* (2013.01); *B60R 16/0207* (2013.01); *B60R 16/0231* (2013.01); *B60R 16/03* (2013.01)

(58) Field of Classification Search
CPC .... G07C 5/0825; B60Q 9/00; B60R 16/0207; B60R 16/0231; B60R 16/03; Y02T 10/40;
(Continued)

(56) References Cited

U.S. PATENT DOCUMENTS 4,776,215 A * 10/1988 Curchod ............... G01M 1/225
 73/462
5,026,293 A    6/1991 Wilson
(Continued)

FOREIGN PATENT DOCUMENTS

JP    H09328086 A  * 12/1997
JP    2016-021740 A    2/2016

OTHER PUBLICATIONS

International Search Report and Written Opinion issued for PCT Application No. PCT/US2019/044854, issued Oct. 28, 2019, 19 pages.
(Continued)

*Primary Examiner* — Rufus C Point
(74) *Attorney, Agent, or Firm* — Foley & Lardner LLP (57) ABSTRACT

A sensor status indicator (SSI) assembly comprises a sensing interface configured to be communicatively coupled to a wiring harness of a sensor and receive a sensor signal therefrom. The sensor signal indicates a sensor status corresponding to a status of an apparatus to which the sensor is coupled. The SSI assembly also includes at least one visual indicator; and a controller communicatively coupled to the sensing interface and the at least one visual indicator. The controller is configured to interpret the sensor signal to determine the sensor status, and activate the at least one visual indicator to generate a visual signal corresponding to the sensor status.

19 Claims, 7 Drawing Sheets

Related U.S. Application Data (60) Provisional application No. 62/723,615, filed on Aug. 28, 2018.

(51) Int. Cl.
 *B60R 16/02* (2006.01)
 *B60R 16/023* (2006.01)
 *B60R 16/03* (2006.01)

(58) Field of Classification Search
 CPC ............... F01N 11/002; F01N 2550/00; F01N 2560/08; F01N 2900/0416; F01N 9/002; H04L 17/00
 See application file for complete search history.

(56) References Cited

U.S. PATENT DOCUMENTS

| | | | | |
|---|---|---|---|---|
| 5,488,307 | A * | 1/1996 | Plott | G01D 18/00 324/555 |
| 5,687,391 | A * | 11/1997 | Judd | G01D 21/02 702/57 |
| 5,702,592 | A * | 12/1997 | Suri | B01D 35/143 210/90 |
| 9,489,828 | B2 | 11/2016 | Lamb et al. | |
| 9,852,500 | B2 * | 12/2017 | Rourke | G06T 7/0006 |
| 2003/0025612 | A1 * | 2/2003 | Holmes | H04Q 9/02 340/870.02 |
| 2003/0221479 | A1 * | 12/2003 | Kim | F02D 33/003 73/114.56 |
| 2004/0002250 | A1 * | 1/2004 | Kolle | H01R 12/67 439/387 |
| 2005/0150304 | A1 * | 7/2005 | Gustafson | G01L 9/14 73/754 |
| 2009/0072956 | A1 | 3/2009 | Kalous | |
| 2013/0027210 | A1 * | 1/2013 | Sheets | F16H 57/0447 701/65 |
| 2015/0348385 | A1 | 12/2015 | Lamb et al. | |
| 2018/0117508 | A1 * | 5/2018 | Paluszewski | B01D 46/523 |
| 2019/0020936 | A1 * | 1/2019 | Phillips | G01D 11/245 |
| 2019/0225151 | A1 * | 7/2019 | Warlock | G01R 31/006 |

OTHER PUBLICATIONS

First Office Action issued for Chinese Patent Application No. CN 2019800559242 issued Aug. 2, 2022, with English translation, 17 pages.

First Office Action issued for Indian Patent Application No. IN 202147005255, issued Jan. 12, 2022, 5 pages.

* cited by examiner

SYSTEMS AND METHODS FOR VISUALLY INDICATING A SENSOR STATUS

CROSS-REFERENCE TO RELATED APPLICATIONS

The present application is a continuation of PCT Application No. PCT/US2019/044854, filed Aug. 2, 2019, which claims priority to and benefit of U.S. Provisional Application No. 62/723,615, filed on Aug. 28, 2018. The contents of these applications are hereby incorporated by reference in their entirety.

TECHNICAL FIELD

The present disclosure relates generally to sensing systems for visually indicating status of sensors.

BACKGROUND

Many systems such as vehicles, power-generation equipment and other systems include many subsystems such as engines, aftertreatment systems, filters, etc. Various sensors are used to determine operational status of such subsystems. For example, many vehicles include filter assemblies that include a filter (e.g., air filters, fuel filters, lubricant filters, water filters, etc.) for removing particulates from a fluid (e.g., air, air/fuel mixture, lubricant, water, etc.). Over time, the particulates accumulate in the filter leading to clogging of the filter and increase in backpressure on the fluid flowing through the filter. Such filters may include a bypass valve to allow the fluid to bypass the filter once the pressure is greater than a pressure threshold. Such situations allow unfiltered fluid to flow into a respective system which is undesirable.

To prevent such occurrences, filters assemblies often include a sensor configured to sense a status of the filter. For example, a pressure sensor may be configured to measure a pressure within the filter assembly which may correspond to a status of a filter, e.g., indicate a fresh filter, filter about to fail, or filter failed. In conventional systems, such sensors are generally coupled via a wiring harness to a controller of the system (e.g., an electronic control module (ECM)) and generate a fault code which is stored in a memory of the ECM and/or indicated on a display (e.g., a dash display of the vehicle) as a general indication (e.g., a check engine light). To determine the status of such sensors, a fault code reader needs to be coupled to the controller to determine the sensor status. Such fault code readers are generally expensive and/or may only available at repair shops, which increases the cost of diagnosing the status of the filter, or any other system that includes a sensor coupled thereto.

SUMMARY

Embodiments described herein relate generally to systems and methods for visually indicating a status of a sensor and in particular, to sensor status indicator assemblies communicatively coupled to a wiring harness of one or more sensors. The sensor status indicator assemblies are configured to receive and interpret a sensor signal from the sensor, and generate a visual signal corresponding to the sensor status.

In a set of embodiments, a sensor status indicator (SSI) assembly comprises a sensing interface configured to be communicatively coupled to a wiring harness of a sensor and receive a sensor signal therefrom. The sensor signal indicates a sensor status corresponding to a status of an apparatus to which the sensor is coupled. The SSI assembly also includes at least one visual indicator; and a controller communicatively coupled to the sensing interface and the at least one visual indicator. The controller is configured to interpret the sensor signal to determine the sensor status, and activate the at least one visual indicator to generate a visual signal corresponding to the sensor status.

In another set of embodiments, a method for visual indication of a sensor status of a sensor comprises communicatively coupling a SSI assembly to a wiring harness of a sensor coupled to an apparatus. The sensor status indicator assembly comprises a sensing interface communicatively coupled to the wiring harness and configured to receive a sensor signal therefrom. The sensor signal indicates a sensor status corresponding to a status of the apparatus. The sensor status indicator assembly also comprises at least one visual indicator, and a controller communicatively coupled to the sensing interface and the at least one visual indicator. A visual signal produced by the at least one visual indicator is recorded. The visual signal corresponds to the status of the apparatus.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to system and methods for visually indicating a status of a sensor and in particular, to sensor status indicator assemblies communicatively coupled to a wiring harness of one or more sensors. The sensor status indicator assemblies are configured to receive and interpret a sensor signal from the sensor, and generate a visual signal corresponding to the sensor status.

In a number of conventional systems, sensors for measuring a status of an apparatus (e.g., a pressure sensor coupled to a filter assembly and configured to measure a pressure therein) are generally coupled via a wiring harness to a controller of the system (e.g., an electronic control module (ECM)) and generate a fault code which is stored in a memory of the ECM and/or indicated on a display (e.g., a dash display of the vehicle) as a general indication (e.g., a check engine light). To determine the status of such sensors, a fault code reader is generally coupled to the controller which is configured to read fault codes stored in the controller and determine the sensor status. Such fault code readers are generally expensive and/or may only available at repair shops, which increases the cost of diagnosing the status of the filter, or any other system that includes a sensor coupled thereto.

Embodiments of the SSI assemblies described herein may provide several benefits including, for example: (1) providing easy to read visual indication of a sensor status which corresponds to a status of an apparatus to which the SSI assembly is coupled; (2) providing easy and low cost installation and adaptation to existing wiring harnesses of existing sensors as well as allowing easy replacement; (3) avoiding modification of existing sensors for integrating visual indicators (e.g., LEDs), thereby circumventing the development of new sensors; (4) allowing inspection at point-of-service rather than a separate location and without using a fault code reader, thereby providing cost savings by avoiding costly diagnostics; and (5) allowing unique configuration of SSI assemblies to allow receiving signals from a plurality of sensors (e.g., 2, 3 or even more), for example, to calculate a difference relative to a stored value.

Figure 1A:
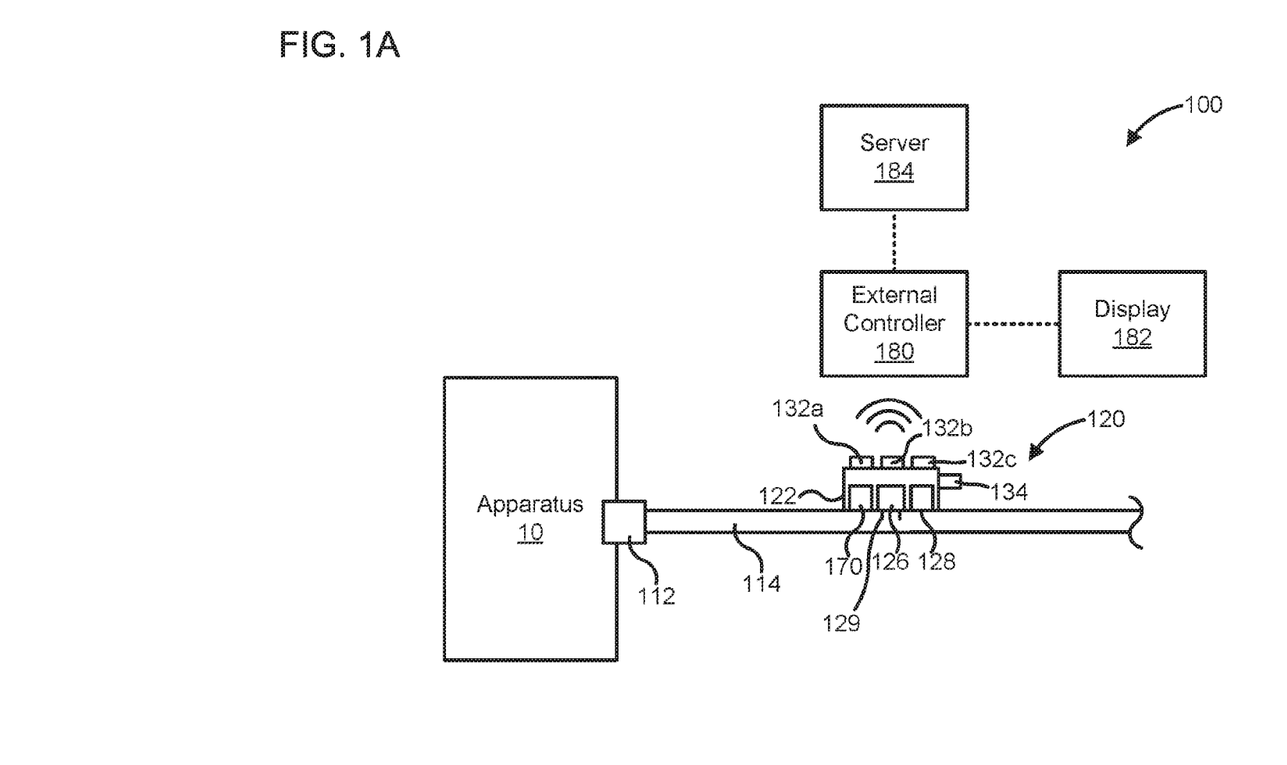
FIG. 1A is a schematic illustration of a sensing system including a SSI assembly, according to an embodiment.

FIG. 1 is a schematic illustration of a sensing system 100 including a SSI assembly 120, according to an embodiment. The sensing system 100 is configured to sense the status of an apparatus 10, for example, to determine if the apparatus 10 working properly, is about to fail or has failed. In some embodiments, the apparatus 10 may comprise a filter assembly comprising a filter (e.g., an air filter, a fuel filter, a lubricant filter, a water filter, an exhaust gas particulate matter filter, or any other suitable filter). In such embodiments, the status of the filter assembly may correspond to the filter working properly (i.e., not clogged), the filter about to fail (i.e., substantially clogged) or filter failed (e.g., filter completely clogged). In other embodiments, the apparatus 10 may be a component of an aftertreatment system, for example, an oxidation catalyst, a selective catalytic reduction (SCR) catalyst, an ammonia slip catalyst or any other aftertreatment component whose status is to be monitored. In still other embodiments, the apparatus 10 may comprise an engine or an engine subsystem.

The sensing system 100 comprises a sensor 112 coupled to the apparatus 10. The sensor 112 is configured to sense a status of the apparatus 10 and generate a sensor signal. The sensor signal indicates a sensor status of the sensor 112 corresponding to the status of the apparatus 10. In embodiments in which the apparatus 10 comprises a filter assembly, the sensor 112 may comprise a pressure sensor configured to determine a pressure within the filter assembly, and generate a sensor signal indicating a sensor status corresponding to the status of the filter assembly. For example, the sensor signal may include a pressure signal which indicates a pressure of the filter assembly (e.g., a pressure difference across the filter assembly). As previously described herein, as the filter gets increasingly clogged, the backpressure exerted on the fluid by the filter as the fluid passes therethrough increases correspondingly such that a larger pressure of the fluid is required to pass through the filter. Very high pressures may occur when the filter is sufficiently clogged and cause failure of the filter assembly (e.g., via breaking or cracking of the filter, or a housing of the filter assembly). A bypass valve may be provided in the filter assembly and configured to allow the fluid to bypass the filter assembly at sufficiently high pressures so as to prevent damage to the filter assembly. This however, results in unfiltered fluid to be delivered to a downstream system which is undesirable.

The pressure exerted by the fluid on the filter which corresponds to the pressure within the filter assembly may be measured by the sensor 112 and is indicative of the status of the filter assembly. The sensor 112 generates a sensor signal which indicates a sensor status corresponding to a status of the filter assembly and may be used to diagnose the filter assembly. For example, a sensor status corresponding to the pressure of the filter assembly being less than a pressure threshold range may indicate that the filter is not clogged and working properly. A sensor status corresponding to the pressure being within the pressure threshold range may indicate that the filter is substantially clogged and is about to fail. Similarly, a sensor status corresponding to the pressure being greater than the predetermined threshold range may correspond to filter being completely blocked or otherwise having failed. In other embodiments, a sensor status corresponding to pressure being below a low pressure threshold may indicate that the filter or the filter assembly has failed (e.g., the filter has cracked).

Referring again to FIG. 1A, a wiring harness 114 is coupled to the sensor 112 and is configured to communicate the sensor signal therefrom to a central controller (e.g., an ECM). The sensor signal may be logged in a memory of the ECM for later reading by a fault reader or displayed on a display (e.g., a dash display).

The SSI assembly 120 is communicatively coupled to the wiring harness 114 and is configured to read the sensor signal from the wiring harness 114. The SSI assembly 120 includes a sensing interface 129, a plurality of visual indicators 132a/b/c and a controller 170 communicatively coupled to the plurality of visual indicators 132a/b/c and the sensing interface 129. The SSI assembly 120 includes an assembly housing 122, which houses the plurality of visual indicators 132a/b/c and the controller 170. In the embodiment shown in FIG. 1A, the sensing interface 129 is integrated with the assembly housing 122. In other embodiments, the sensing interface 129 may be positioned remote from the assembly housing 122 (e.g., as described with respect to the SSI assembly 220, 320, 620 and 720). In still other embodiments, the sensing interface 129 may be disposed inside a connector that mates with the sensor 112, for example via leads, pins, wiring, etc.

The sensing interface 129 is communicatively coupled to the wiring harness 114 to receive a sensor signal (e.g., an analog signal such as current, voltage or frequency) therefrom, the sensor signal indicating the sensor status corresponding to a status of the apparatus 10. In some embodiments, the sensing interface 129 may include pins or electrical wires electrically coupled to the wiring harness 114. For example, the sensing interface 129 may include pins inserted through a protective sheath of the wiring harness 114 to contact an underlying electric lead of the wiring harness that transmits the sensor signal. Alternatively, the sensing interface 129 may include an electrical wire and a portion of the protective sheath of the wiring harness may be stripped off to connect the electrical wire to the underlying electrical lead of the wiring harness 114.

In other embodiments, the sensing interface 129 may include a wireless receiver configured to sense the sensor signals transmitted through the electrical lead of the wiring harness without physically connecting the sensing interface to the electrical lead. For example, the sensing interface 129 may include an inductive sensor, a current clamp (e.g., hall effect sensor, a transformer or a vane type coil) or any other wireless sensor positioned around the wiring harness 114 (e.g., clipped to a portion of the wiring harness or positioned around the wiring harness 114) and configured to detect the sensor signal transmitted through the wiring harness 114.

The plurality of visual indicators 132a/b/c may include any suitable visual indicator that can generate a visual signal corresponding to the sensor signal in response to an indicator signal from the controller 170. The controller 170 is configured to interpret the sensor signal to determine the sensor status. The controller 170 is also configured to activate at least one visual indicator of the plurality of visual indicators 132a/b/c to generate a visual signal corresponding to the sensor status.

For example, the plurality of visual indicators 132a/b/c may include light emitting diodes (LEDs) configured to generate different visual signals, for example, different colors indicating a specific sensor status corresponding to a specific status of the apparatus 10. In other embodiments, the SSI assembly 120 may include a single LED configured to generate a visual signal comprising different colors corresponding to the sensor status. In still other embodiments, the SSI assembly 120 may include an LED or LCD display for displaying the sensor status using any other visual signal. For example, the visual signal may include a bar which progressively increases in height based on a life or operational efficiency of the apparatus 10 (e.g., increasing height of the bar corresponding to increase in clogging of a filter) or displaying in alphabets or symbols the status of the sensor (e.g., OPERATIONAL, FAILING, FAILED, etc.).

In embodiments in which the apparatus 10 includes a filter assembly, a first visual indicator 132a (e.g., a first LED) of the plurality of visual indicators 132a/b/c may include a green LED configured to be activated when the pressure signal generated by the sensor 112 corresponds to the pressure of the filter assembly being less than the pressure threshold range indicating that the filter assembly is working property (i.e., the filter is not clogged). A second visual indicator 132b (e.g., a second LED) of the plurality of visual indicators 132a/b/c may include a yellow LED configured to be activated when the pressure signal generated by the sensor 112 corresponds to the pressure of the filter assembly being within the pressure threshold range indicating that the filter assembly is about to fail (i.e., the filter is substantially clogged). Similarly, a third visual indicator 132c of the plurality of visual indicators 132a/b/c may comprise a red LED configured to be activated when the pressure signal generated by the sensor 112 corresponds to the pressure of the filter assembly being greater than the pressure threshold range or below the low pressure threshold indicating that the filter assembly has failed (i.e., the filter is completely clogged or has cracked, respectively).

In some embodiments, the controller 170 may also be configured to determine an operational status of the sensor 112 based on the sensor signal. For example, the controller 170 may determine that the sensor 112 has malfunctioned if large or fast moving transients are observed in the sensor signal, or conversely, negligible changes are observed in the sensor signal over long operational periods of the apparatus 10.

Figure 1B:
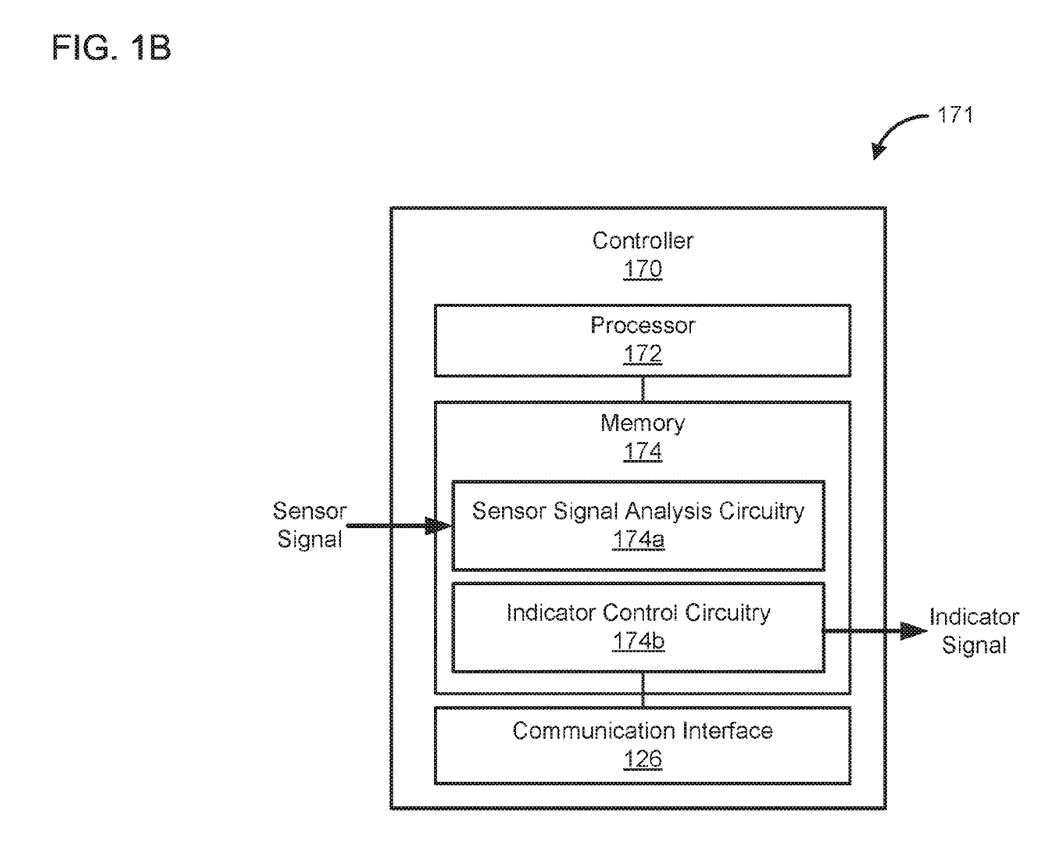
FIG. 1B is a schematic block diagram of a controller which may be included in the SSI assembly of FIG. 1A, according to an embodiment.

In particular embodiments, the controller 170 may be included in a control circuitry. For example, FIG. 1B is a schematic block diagram of a control circuitry 171 that comprises the controller 170, according to an embodiment. The controller 170 comprises a processor 172, a memory 174, or any other computer readable medium, and may also include a communication interface 126. Furthermore, the controller 170 includes a sensor signal analysis circuitry 174a and an indicator control circuitry 174b. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the sensor signal analysis circuitry 174a and the indicator control circuitry 174b are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor signal analysis circuitry 174a and the indicator control circuitry 174b may be embodied as one or more circuitry components including, but not limited to, processing circuitry, network interfaces, peripheral devices, input devices, output devices, sensors, etc.

In some embodiments, the sensor signal analysis circuitry 174a and the indicator control circuitry 174b may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor signal analysis circuitry 174a and the indicator control circuitry 174b may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the sensor signal analysis circuitry 174a and the indicator control circuitry 174b may also include programmable hardware devices such as field programmable gate arrays, programmable array logic, programmable logic devices or the like. In this regard, the sensor signal analysis circuitry 174a and the indicator control circuitry 174b may include one or more memory devices for storing instructions that are executable by the processor(s) of the sensor signal analysis circuitry 174a and the indicator control circuitry 174b. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect the sensor signal analysis circuitry 174a and the indicator control circuitry 174b. Thus, the depicted configuration represents the aforementioned arrangement where the sensor signal analysis circuitry 174a and the indicator control circuitry 174b are embodied as machine or computer-readable media. However, as mentioned above, this illustration is not meant to be limiting as the present disclosure contemplates other embodiments such as the aforementioned embodiment where the sensor signal analysis circuitry 174a and the indicator control circuitry 174b, or at least one circuit of the sensor signal analysis circuitry 174a and the indicator control circuitry 174b are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the sensor signal analysis circuitry 174a and the indicator control circuitry 174b) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The sensor signal analysis circuitry 174a may be configured to interpret the sensor signal received from the sensor 112 (e.g., a voltage, current, frequency or any other analog signal) and determine a sensor status therefrom. The indicator control circuitry 174b is configured to generate an indicator signal (e.g., current, voltage or frequency) to activate at least one of the plurality of visual indicators 132a/b/c based on the sensor status determined from the sensor signal, as previously described herein.

The communication interface 126 may include wireless interfaces (e.g., jacks, antennas, transmitters, receivers, communication interfaces, wire terminals, etc.) for conducting data communications with the sensing interface 129, optionally an external controller 180 For example, the communication interface 126 may include a controller sensor for receiving the sensor signal. In some embodiments, the communication interface 126 may be structured to communicate via local area networks or wide area networks (e.g., the Internet, etc.) and may use a variety of communications protocols (e.g., IP, LON, Bluetooth, Bluetooth Low Energy (BTLE), ZigBee, radio, cellular, near field communication, etc.) with the external controller. In other embodiments, the communication interface 126 may include a wired interface (e.g., a CAN bus, a serial interface, a Universal Serial Bus (USB) interface) to allow coupling of the controller 170 to the external controller 180 (e.g., an ECM, a data logger, a dash display, etc.).

For example, the external controller 180 may be coupled to a display 182 and/or a server 184. The communication interface 126 may be selectively activated, for example, via an activation signal from the external controller 180 or a remote control (e.g., a garage opener, or a remote ignition type signal generator) and communicate a sensor status signal to the external controller 180. The external controller 180 may be configured to interpret and/or communicate the sensor status signal to the display 182 to show the sensor status on the display 182 (e.g., via a web interface or dedicated application). The display 182 maybe integrated with the external controller 180 (e.g., in a hand held device) or located remotely from the external controller 180. Furthermore, the external controller 180 may be configured to communicate the sensor status signal to the server 184, for example, to enable remote monitoring or data logging on the server 184. In other embodiments, the communication interface 126 may be used to receive software updates (e.g., via BTLE) from the external controller, for example, for reprogramming the controller 170 or resetting the SSI assembly 120.

In some embodiments, the controller 170 may be configured to determine an average sensor status over a period of time and communicate the average sensor status to the server 184 or display 182 via the communication interface 126. In other embodiments, the controller 170 may be configured to determine an anomalous or outlier sensor status (e.g., corresponding to failure of the apparatus 10 or the sensor 112) and communicate the anomalous sensor status to the server 184 or the display 182.

In some embodiments, the SSI assembly 120 may be configured to draw electrical power directly from the wiring harness 114. In such embodiments, the sensing interface 129 may include pins or wires electrically coupled to the wiring harness 114 as previously described herein to draw electrical power therefrom for powering the SSI assembly 120 in addition to determining the sensor signal therefrom. In other embodiments in which the sensing interface 129 includes an inductive coupling, the SSI assembly 120 may include an inductive power generator configured to inductively generate electrical power using the electrical signal passing through the wiring harness 114.

In the above described embodiments, the SSI assembly 120 may be continuously powered ON. Furthermore, at least one of the plurality of visual indicators 132a/b/c may always be activated based on the sensor status of the sensor 112. In some embodiments, the SSI assembly 120 may include a switch 134 (e.g., a toggle switch or button) which may be selectively engaged by a user to activate or deactivate the plurality of visual indicators 132a/b/c. In some embodiments, a remote control (e.g., a garage opener, or a remote ignition type signal generator) may be used to turn on a system (e.g., a vehicle) including the apparatus 10 and the SSI assembly 120 for a short period of time (e.g., 10, 15, 20, 25, or 30 seconds) to enable the SSI assembly 120 to measure the sensor signal and indicate the sensor status to a user via at least one of the visual indicators 132a/b/c. In other embodiments, the system (e.g., a vehicle) may be turned ON for longer periods of time, for example, when the SSI assembly 120 is being reset. In particular embodiments, the SSI assembly 120 may be remotely activated by an activation signal, for example, a BTLE activation signal received via the communication interface 126.

In some embodiments, the SSI assembly 120 may also include a power source 128 configured to provide power to the SSI assembly 120. The power source 128 may include, for example, a battery (e.g., a replaceable battery or a rechargeable battery). In such embodiment, the SSI assembly 120 or at least the plurality of visual indicators 132a/b/c may generally be in an OFF or inactive configuration, for example, to save power. The SSI assembly 120 may be selectively turned ON, for example, via the switch 134 or via an activation signal received via the communication interface 126.

Figure 2:
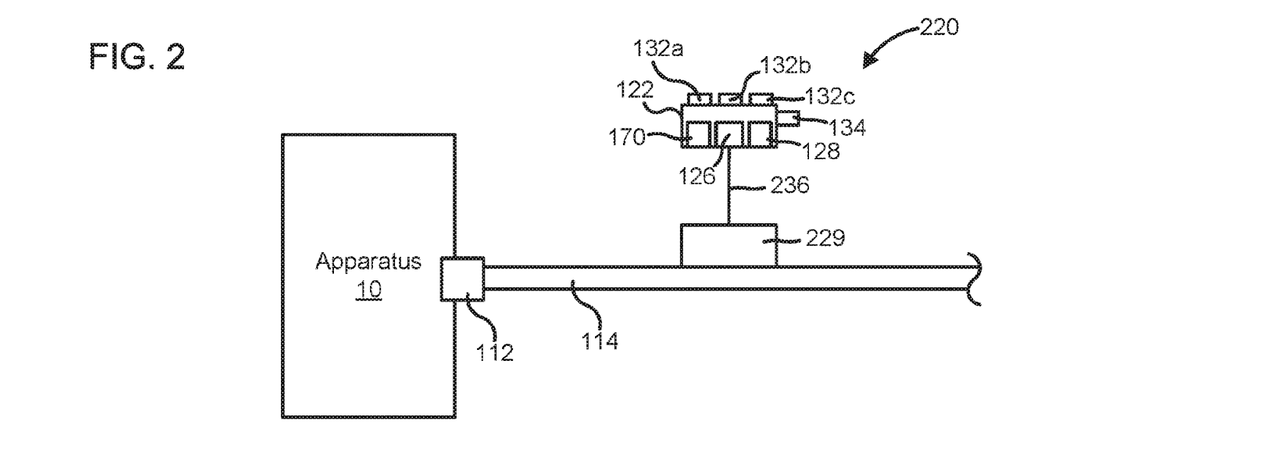
FIGS. 2-7 are schematic illustrations of SSI assemblies according to various embodiments.

In some embodiments, a sensing interface of a SSI assembly may be positioned remotely from other components of the SSI assembly. For example, FIG. 2 is a schematic illustration of a SSI assembly 220, according to another embodiment. The SSI assembly 220 includes the housing assembly 122, the plurality of visual indicators 132a/b/c, the controller 170, and may optionally also include the communication interface 126, the power source 128 and the switch 134. The SSI assembly 220 comprises a sensing interface 229 communicatively coupled to the wiring harness 114 of the sensor 112, for example physically connected to an electrical lead of the wiring harness or wirelessly (e.g., inductively) coupled thereto. The sensing interface 229 is positioned remotely from the assembly housing 122, and a sensing interface lead 236 electrically couples the sensing interface 229 to the controller 170. The sensing interface lead 236 may include a CAN bus, a serial or analog transmission wire, etc. Remotely positioning the sensing interface 229 from the assembly housing 122 may allow positioning of the assembly housing 122 and thereby, the visual indicators 132a/b/c at a more convenient location relative to the sensing interface 229, for example, to facilitate observation by a user. In some embodiments, the sensing interface 229 may be disposed inside a connector that mates with the sensor 112, for example via leads, pins, wiring, etc.

Figure 3:
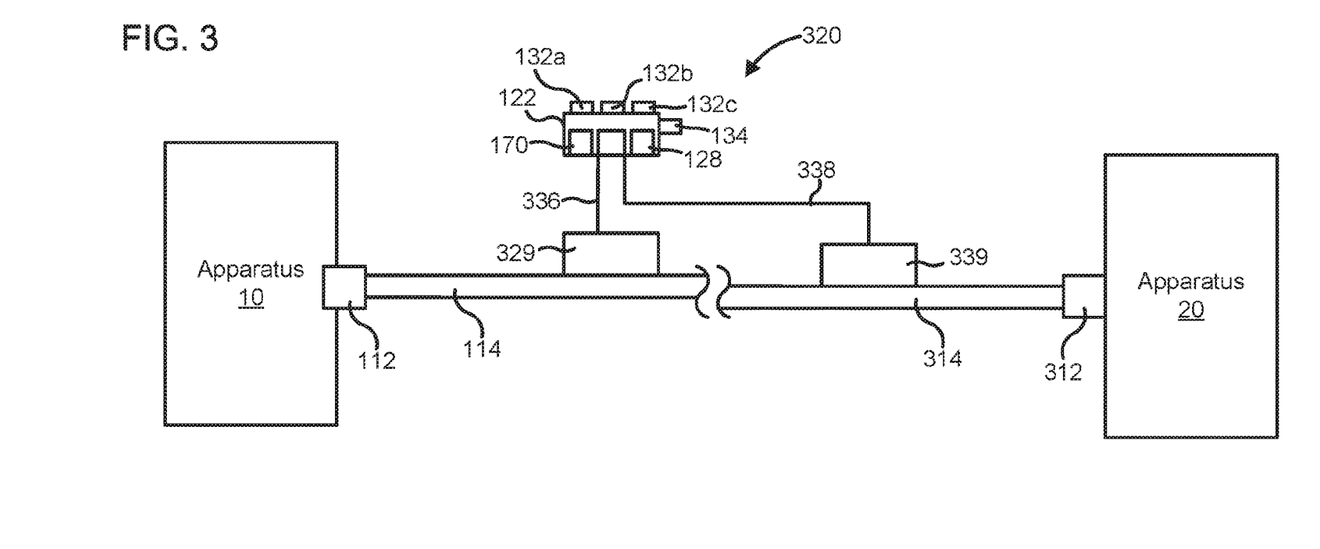

In some embodiments, a single SSI assembly may be used to determine the sensor status of two or even more sensors. For example, FIG. 3 is a schematic illustration of a SSI assembly 320, according to another embodiment. The SSI assembly 220 includes the housing assembly 122, the plurality of visual indicators 132a/b/c, the controller 170 and the switch 134, and may optionally also include the communication interface 126 and the power source 128. The SSI assembly 320 comprises a first sensing interface 329 communicatively coupled to the wiring harness 114 of the sensor 112 which is coupled to the apparatus 10, for example physically connected to an electrical lead of the wiring harness or inductively coupled thereto. The first sensing interface 329 is positioned remotely from the assembly housing 122, and a first sensing interface lead 336 electrically couples the first sensing interface 329 to the controller 170.

The SSI assembly 320 also comprises a second sensing interface 339 also remotely positioned from the assembly housing 122. The second sensing interface 339 is communicatively coupled to a second wiring harness 314 of a second sensor 312 which is operably coupled to a second apparatus 20 (e.g., a second filter assembly). In some embodiments, each of first sensing interface 329 may be disposed inside a first connector that mates with the sensor 112, and the second sensing interface 339 may be disposed inside a second connector that mates with the second sensor 312, for example via leads, pins, wiring, etc. In some embodiments, the switch 134 may be configured to be switched between the first sensing interface 329 and the second sensing interface 339 selectively by a user. For example, in a first configuration (e.g., a first position), the switch 134 may communicatively couple the controller 170 to the first sensing interface 329 to allow processing of the sensor signal therefrom. In the first configuration, the visual signal displayed by the visual indicators 132a/b/c correspond to the sensor status of the sensor 112.

In a second configuration (e.g., a second position), the switch 134 may communicatively the couple the controller 170 to the second sensor 312. The second sensor generates a second sensor signal indicating a second sensor status corresponding to a status of the second apparatus 20 to which the second sensor 312 is coupled. The controller 170 may receive the second sensor signal from the second sensor 312, interpret the second sensor signal to determine the second sensor status, and activate at least one of the visual indicators 132a/b/c to generate a visual signal corresponding to the second sensor status. In some embodiments, the switch 134 may also be movable into a third configuration (e.g., a third position) in which the switch 134 deactivates the SSI assembly 120 (e.g., the controller 170, the communication interface 126 and the plurality of visual indicators 132a/b/c) or at least the plurality of visual indicators 132a/b/c (e.g., turns the SSI assembly 120 or at least the plurality of visual indicators 132a/b/c OFF). In some embodiments, the switch 134 may include a dual function button. In such embodiments, engaging the button for a first time period may communicatively couple the first sensing interface 329 to the controller 170 and engaging the button for a second time period longer than the first time period may communicatively couple the second sensing interface 339 to the controller 170.

Figure 4:
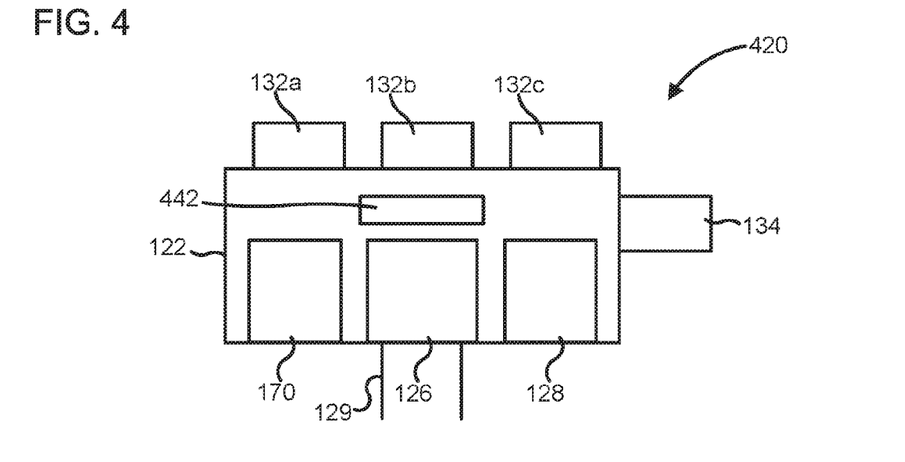

In some embodiments, an SSI assembly may include an activation sensor configured to sense a predetermined sensor signal threshold before activating one or more visual indicators or providing power to a controller of the SSI assembly, for example, to conserve power. For example, FIG. 4 is a schematic illustration of a SSI assembly 420, according to an embodiment. The SSI assembly 420 comprises the assembly housing 122, the plurality of visual indicators 132a/b/c, the controller 170, and may optionally also include the communication interface 126, the power source 128 and/or the sensing interface 129. In other embodiments, the SSI assembly 420 may include the sensing interface 229 coupled to the controller 170 via the sensing interface lead 236.

The SSI assembly 420 also includes an activation sensor 442. The activation sensor 442 may be configured to measure a sensor status signal received from a sensor (e.g., the sensor 112) and in response to the sensor status signal being above a sensor status threshold, below a sensor status threshold, within a predetermined sensor status threshold range or any suitable combination thereof, activate the plurality of visual indicators 132a/b/c or the controller 170, for example, to conserve power. In some embodiments, in which the sensor (e.g., the sensor 112) includes a pressure sensor, the activation sensor 442 may include a pressure switch. In such embodiments, the activation sensor 442 may be configured to activate the visual indicators 132a/b/c or the controller 170 (e.g., communicatively couple the visual indicators 132a/b/c to the controller 170 or communicatively couple the power source 128 to the controller 170 to selectively allow transmission of electrical power thereto) in response to the sensor status corresponding to a pressure being within a predetermined threshold range, above a predetermined threshold or below a low pressure threshold, as previously described herein. In other embodiments, the activation sensor 442 may include a MEMS sensor, a capacitive sensor, a transistor or any other solid state sensor which may serve as a gate for activating the plurality of visual indicators 132a/b/c, for example, to supply electrical power thereto when a sensor signal (e.g., a pressure) signal is present, thereby conserving power.

Figure 5:
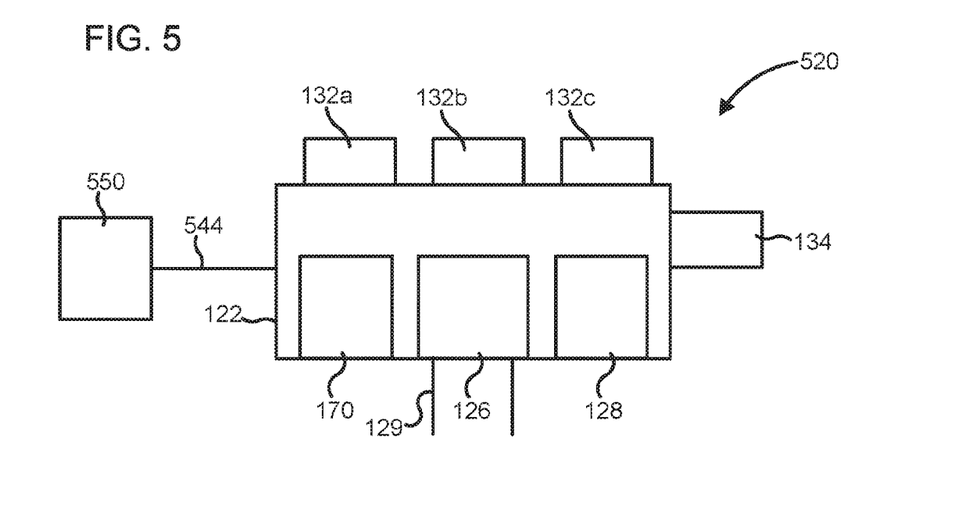

In some embodiments, a SSI assembly may also be coupled to an external power source or an external controller. For example, FIG. 5 is a schematic illustration of a SSI assembly 520, according to an embodiment. The SSI assembly 520 comprises the assembly housing 122, the plurality of visual indicators 132a/b/c, the controller 170, and may optionally also include the communication interface 126, the power source 128 and/or the sensing interface 129. In other embodiments, the SSI assembly 520 may include the sensing interface 229 coupled to the controller 170 via the sensing interface lead 236.

The SSI assembly 520 also comprises a communication lead 544 (e.g., a CAN bus or an analog or digital transmission line) coupled to an external system 550. In some embodiments, the external system 550 may comprise an external power source (e.g., a vehicle battery or alternator) configured to provide electric power to the SSI assembly 520, for example, for powering the controller 170, the plurality of visual indicators 132a/b/c and/or recharge the power source 128. In other embodiments, the external system 550 may comprise an external controller (e.g., an ECM) configured to communicate with the controller 170, for example, to receive data corresponding to the sensor status from the SSI assembly 520, reset the controller 170 or reprogram the controller 170. In particular embodiments, the SSI assembly 520 may include a communication interface, for example, a CAN interface, a serial interface, a USB interface or any other suitable interface provided in the assembly housing 122 for selectively allowing coupling of the controller 170 to the external system 550. In still other embodiments, the external system 550 may comprise a telematics system, a data logger and/or a display (e.g., a dash display of a vehicle).

Figure 6:
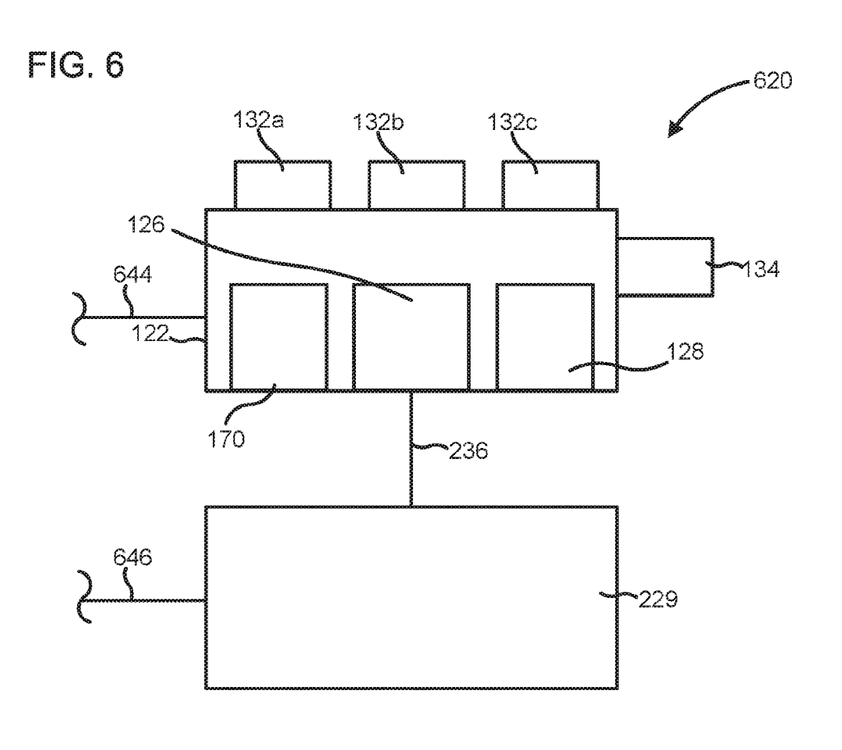

FIG. 6 is a schematic illustration of a SSI assembly 620, according to another embodiment. The SSI assembly 620 comprises the assembly housing 122, the plurality of visual indicators 132a/b/c, the controller 170, and may optionally also include the communication interface 126 and the power source 128. The SSI assembly 620 also includes the sensing interface 229 positioned remotely from the assembly housing 122 and communicatively coupled to the controller 170 positioned in the assembly housing 122 via the sensing interface lead 236. The SSI assembly 620 further comprises a first communication lead 644 communicatively coupling the controller to an external system (e.g., the external system 550, as previously described herein). Furthermore, a second communication lead 646 couples the sensing interface 229 to the external system or any other external system described herein, so as to allow communication between the external system and the sensing interface 229. In particular embodiments, any one of the first or second communication lead 644 or 646 may be excluded such that the remaining communication lead 644 or 646 may serve to allow communication between the external system and each of the controller 170 and the sensing interface 229.

Figure 7:
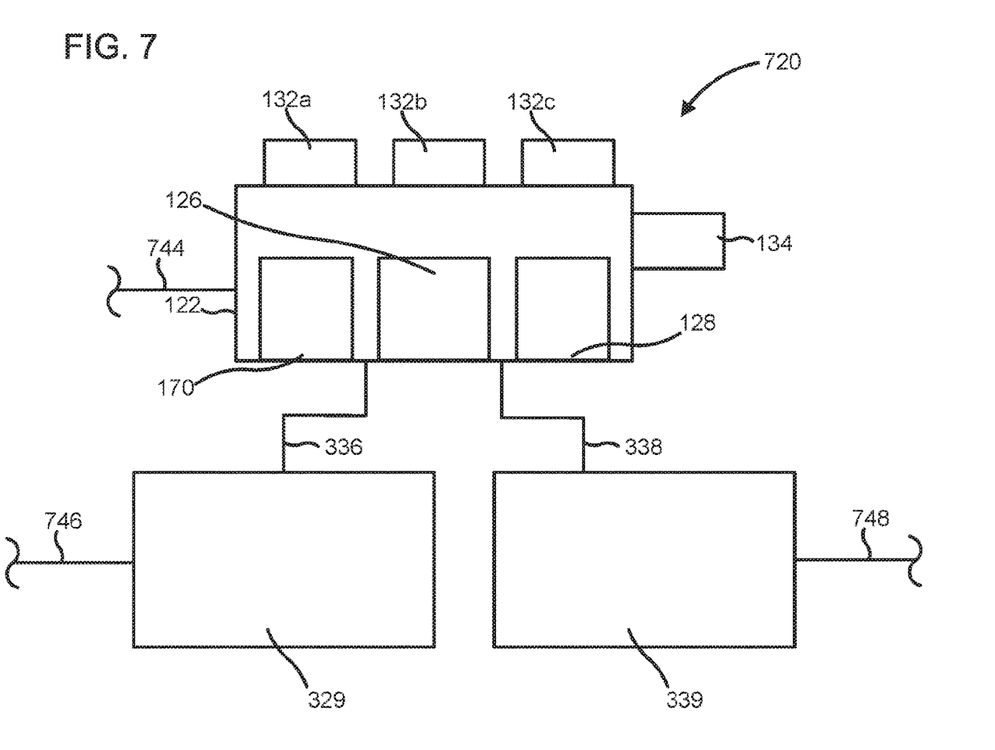

FIG. 7 is a schematic illustration of a SSI assembly 720, according to yet another embodiment. The SSI assembly 720 comprises the assembly housing 122, the plurality of visual indicators 132a/b/c, the controller 170, and may optionally also include the communication interface 126 and the power source 128. The SSI assembly 620 also includes the first sensing interface 329 and the second sensing interface 339 positioned remotely from the assembly housing 122 and communicatively coupled to the controller 170 positioned in the assembly housing 122 via the first sensing interface lead 336 and the second sensing interface lead 338. The SSI assembly 720 comprises a first communication lead 744 communicatively coupling the controller to an external system (e.g., the external system 550, as previously described herein). Furthermore, a second communication lead 746 couples the first sensing interface 329 and a third communication lead 748 couples the second sensing interface 339 to the an external system (e.g., the external system 550 or any other external system described herein), so as to allow communication between the external system and the controller 170 as well as each of the sensing interfaces 329 and 339. In particular embodiments, any one of the first, second or third communication leads 744, 746 or 748 may be excluded such that the remaining communication lead may serve to allow communication between the external system and each of the controller 170 and the sensing interfaces 329 and 339.

Figure 8:
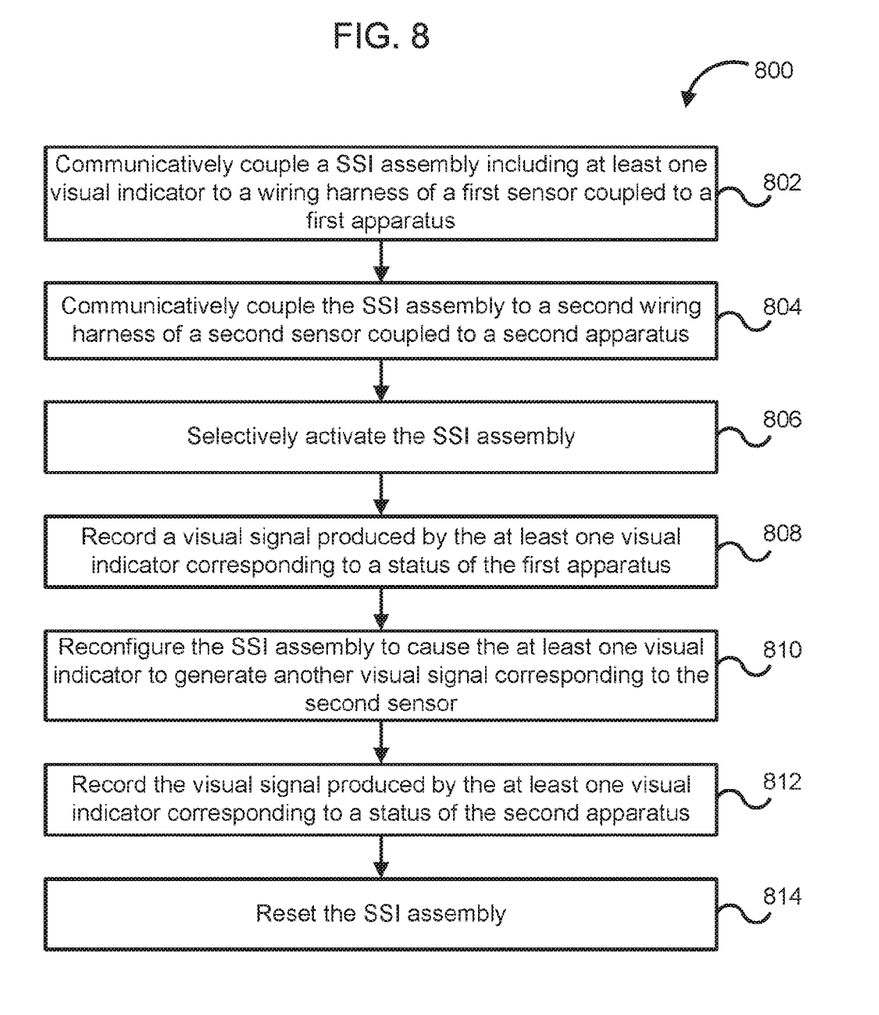
FIG. 8 is a schematic flow diagram of an exemplary method for visually indicating a status of an apparatus via an SSI assembly, according to an embodiment.

FIG. 8 is a schematic flow diagram of a method 800 for visual indication of a sensor status of sensor, according to an embodiment. The method 800 comprises communicatively coupling a SSI assembly (e.g., the SSI assembly 120, 220, 320, 420, 520, 620, 720) including at least one visual indicator (e.g., the plurality of visual indicators 132a/b/c) to a wiring harness (e.g., the wiring harness 114) of a first sensor (e.g., the first sensor 112) coupled to an apparatus (e.g., the apparatus 10), at 802. For example, the sensing interface 129 or 229 of the SSI assembly 120, 220 is coupled to the wiring harness 114.

In some embodiments, the SSI assembly (e.g., the SSI assembly 320, 720) may include a first sensing interface (e.g., the first sensing interface 329) and a second sensing interface (e.g., the second sensing interface 339). In such embodiments, the method 800 may also include communicatively coupling the SSI assembly to a second wiring harness (e.g., the second wiring harness (e.g., the second wiring harness 314) of a second sensor (e.g., the second sensor 312) coupled to a second apparatus (e.g., the second apparatus 20), at 804. For example, the first sensing interface 329 may be coupled to the first wiring harness 114 and the second sensing interface 339 is coupled to the second wiring harness 314.

In some embodiments, the SSI assembly is selectively activated, at 806. For example, the switch 134 may be used to selectively activate the controller 170 or the plurality of visual indicators 132a/b/c to conserve power, as previously described herein. In other embodiments, the SSI assembly may be continuously activated, for example, in embodiments in which the SSI assembly draws electrical power from the wiring harness or an external power source.

At 808, a visual signal produced by the at least one visual indicator is recorded, the visual signal corresponding to a status of the apparatus. For example, a visual signal produced by at least one of the visual indicators 132a/b/c is recorded (e.g., a visually observed by a user or recorded in a data logger or memory of an external controller or server) and indicates a sensor status corresponding to a status of the apparatus to which the sensor is coupled.

In some embodiments, in which the SSI assembly includes two sensing interfaces coupled to respective wiring harnesses, the method 800 may also include reconfiguring the SSI assembly to cause the at least one visual indicator to generate visual signal corresponding to the second sensor, at 810. For example, the switch 134 may be engaged to communicatively couple the second sensing interface 339 to the controller 170 and disconnect the first sensing interface 329 therefrom. This allows the controller 170 to determine the second sensor status of the second sensor and activate at least one of the plurality of visual indicators 132a/b/c based on the second sensor status which corresponds to a status of the second apparatus 20. At 812, the visual signal produced by the at least one visual indicator (e.g., at least one of the plurality of visual indicators 132a/b/c) corresponding to the status of the second apparatus (e.g., the second apparatus 20) is recorded (e.g., observed visually or stored in a data logger).

In some embodiments, the SSI assembly is reset, at 814. For example, an external controller (e.g., the external system 550) may communicate a reset signal to the SSI assembly 520 through the communication lead 544 or wirelessly (e.g., via BTLE) to reset the controller 170 of the SSI assembly 520 or reprogram the controller 170.

It should be noted that the term "example" or "exemplary" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the terms "substantially' and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

The terms "coupled," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various embodiments presented herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A sensor status indicator assembly, comprising:
    a sensing interface configured to be communicatively coupled to a wiring harness of a sensor and receive a sensor signal therefrom, the sensor signal indicating a sensor status corresponding to a status of an apparatus to which the sensor is coupled;
    at least one visual indicator;
    a controller communicatively coupled to the sensing interface and the at least one visual indicator, the controller configured to:
        interpret the sensor signal to determine the sensor status; and
        activate the at least one visual indicator to generate a visual signal corresponding to the sensor status comprising:
            activating a first visual indicator of the at least one visual indicator in response to the sensor status being a first sensor status indicating that a pressure value regarding a filter assembly is at or below a pressure threshold range, activating a second visual indicator of the at least one visual indicator, different from the first visual indicator, in response to the sensor status being a second sensor status indicating that the pressure value regarding the filter assembly is within the pressure threshold range, and activating a third visual indicator of the at least one visual indicator, different from the first visual indicator and the second visual indicator, in response to the sensor status being a third sensor status indicating that the pressure value regarding the filter assembly is at or below a low pressure threshold; and an assembly housing that houses the controller and the at least one visual indicator.

2. The sensor status indicator assembly of claim 1, wherein the sensing interface is integrated into the assembly housing.

3. The sensor status indicator assembly of claim 1, wherein the sensing interface is positioned remotely from the assembly housing, and wherein the sensor status indicator assembly further comprises a sensing interface lead electrically coupling the sensing interface to the controller.

4. The sensor status indicator assembly of claim 1, wherein the sensing interface is a first sensing interface, and wherein the sensor status indicator assembly further comprises:

a second sensing interface configured to be communicatively coupled to a second wiring harness of a second sensor, and receive a second sensor signal therefrom, the second sensor signal indicating a second apparatus sensor status corresponding to a status of a second apparatus to which the second sensor is coupled, and wherein the controller is also communicatively coupled to the second sensing interface and is configured to:

selectively receive the second sensor signal from the second sensor based on a user input;

interpret the second sensor signal to determine the second apparatus sensor status; and activate the at least one visual indicator to generate a visual signal corresponding to the second apparatus sensor status.

5. The sensor status indicator assembly of claim 4, further comprising a switch movable between a first configuration, in which the controller is communicatively coupled with the first sensing interface, and a second configuration, in which the controller is communicatively coupled with the second sensing interface.

6. The sensor status indicator assembly of claim 5, wherein the switch is further movable to a third configuration in which at least a portion of a sensor status indicator assembly is deactivated.

7. The sensor status indicator assembly of claim 1, wherein the sensing interface comprises pins configured to be inserted through a protective sheath of the wiring harness so as to contact an underlying electrical lead of the wiring harness that transmits the sensor signal.

8. The sensor status indicator assembly of claim 1, wherein the wiring harness includes an electrical lead covered with a protective sheath, a portion of the protective sheath being removed to expose a corresponding portion of the electrical lead, and wherein the sensing interface comprises an electrical wire configured to be electrically coupled to the exposed portion of the electrical lead.

9. The sensor status indicator assembly of claim 1, wherein the wiring harness includes an electrical lead covered with a protective sheath, and wherein the sensing interface comprises a wireless sensor configured to sense the sensor signal transmitted through the electrical lead without physically connecting the sensing interface to the electrical lead.

10. The sensor status indicator assembly of claim 1, wherein the at least one visual indicator comprises a plurality of light emitting diodes (LEDs), each of the LEDs configured to generate a different visual signal corresponding to a specific status of the apparatus.

11. The sensor status indicator assembly of claim 1, wherein the controller is further configured to:

in response to the sensor signal having large or fast moving transients, or negligible changes being present in the sensor signal over long operational periods of the apparatus, determining that the sensor has malfunctioned; and activate the at least one visual indicator to generate a visual signal corresponding to the sensor having malfunctioned.

12. The sensor status indicator assembly of claim 1, further comprising a switch engageable by a user to selectively activate or deactivate at least a portion of the sensor status indicator assembly.

13. The sensor status indicator assembly of claim 1, further comprising a power source configured to provide electrical power to the sensor status indicator assembly.

14. The sensor status indicator assembly of claim 1, further comprising an activation sensor configured to measure the sensor signal and selectively activate at least a portion of the sensor status indicator assembly based on the sensor signal.

15. The sensor status indicator assembly of claim 1, further comprising a communication lead configured to be coupled to an external system to allow communication between the external system and the controller and/or allow electrical power to be drawn by the sensor status indicator assembly from the external system.

16. A method for visual indication of a sensor status of a sensor, comprising:

communicatively coupling a sensor status indicator assembly to a wiring harness of a sensor coupled to an apparatus, the sensor status indicator assembly comprising:

a sensing interface communicatively coupled to the wiring harness and configured to receive a sensor signal therefrom, the sensor signal indicating a sensor status corresponding to a status of the apparatus, at least one visual indicator, a controller communicatively coupled to the sensing interface and the at least one visual indicator, and an assembly housing that houses the controller and the at least one visual indicator;

causing the at least one visual indicator to generate a visual signal corresponding to the sensor status comprising:

activating a first visual indicator of the at least one visual indicator in response to the sensor status being a first sensor status indicating that a pressure value regarding a filter assembly is at or below a pressure threshold range, activating a second visual indicator of the at least one visual indicator, different from the first visual indicator, in response to the sensor status being a second sensor status indicating that the pressure value regarding the filter assembly is within the pressure threshold range, and activating a third visual indicator of the at least one visual indicator, different from the first visual indicator and the second visual indicator, in response to the sensor status being a third sensor status indicating that the pressure value regarding the filter assembly is at or below a low pressure threshold.

17. The method of claim 16, further comprising selectively activating the sensor status indicator assembly so as to cause the at least one visual indicator to produce the visual signal.

18. The method of claim 16, wherein the wiring harness is a first wiring harness, the sensor is a first sensor and the apparatus is a first apparatus, and wherein the method further comprises:

communicatively coupling the sensor status indicator assembly to a second wiring harness of a second sensor coupled to a second apparatus;

reconfiguring the sensor status indicator assembly to cause the at least one visual indicator to generate a second visual signal corresponding to the second sensor; and recording the second visual signal produced by the at least one visual indicator, the second visual signal corresponding to a status of the second apparatus.

19. The method of claim 16, further comprising resetting the sensor status indicator assembly.

* * * * *